Jan. 27, 1970    G. J. KUHN ET AL    3,492,015
COMBINED SLED AND COLLAPSIBLE SHELTER
Filed April 29, 1968    2 Sheets-Sheet 1
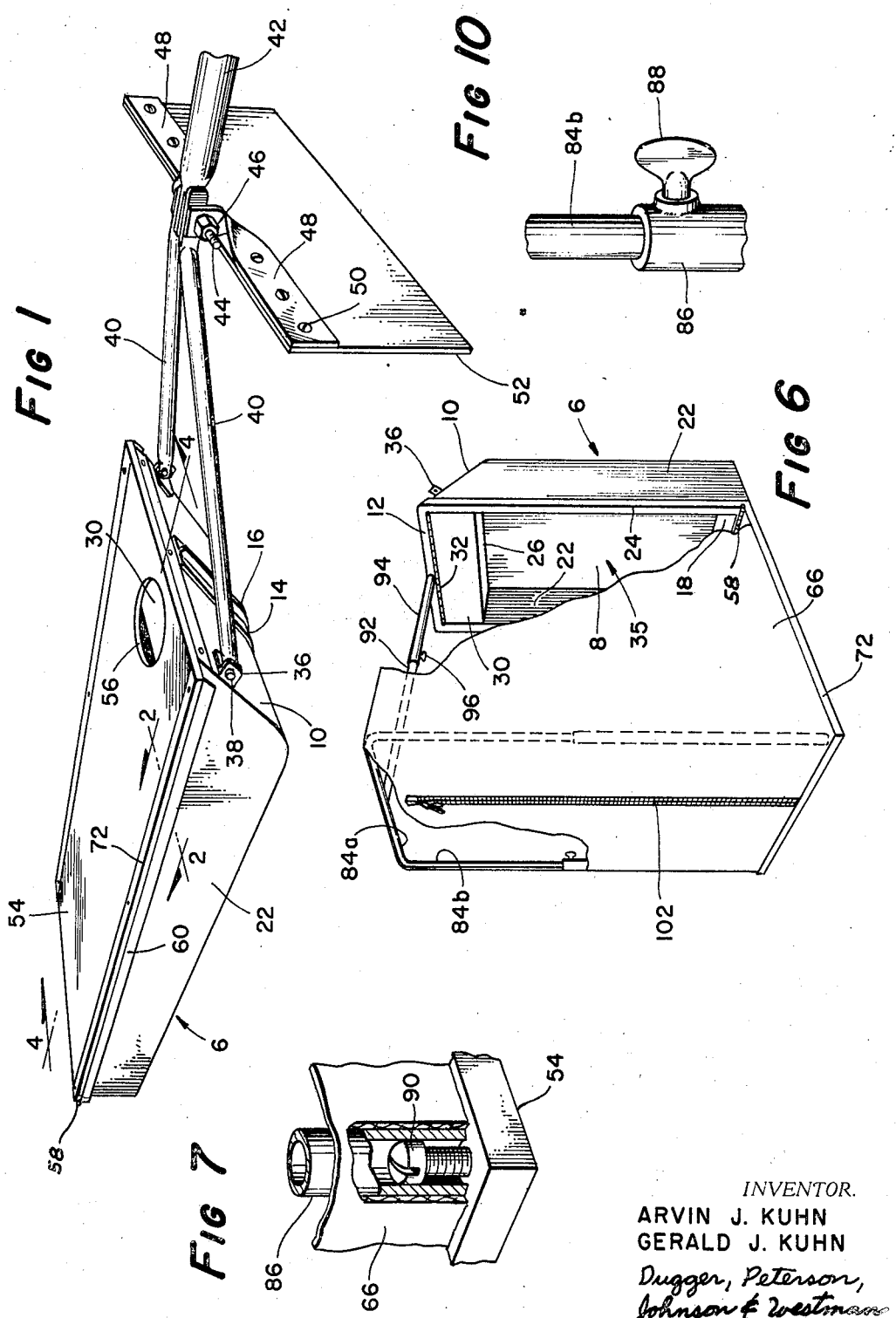
INVENTOR.
ARVIN J. KUHN
GERALD J. KUHN
Dugger, Peterson,
Johnson & Westman
Attorneys Jan. 27, 1970          G. J. KUHN ET AL          3,492,015
              COMBINED SLED AND COLLAPSIBLE SHELTER
Filed April 29, 1968                         2 Sheets-Sheet 2
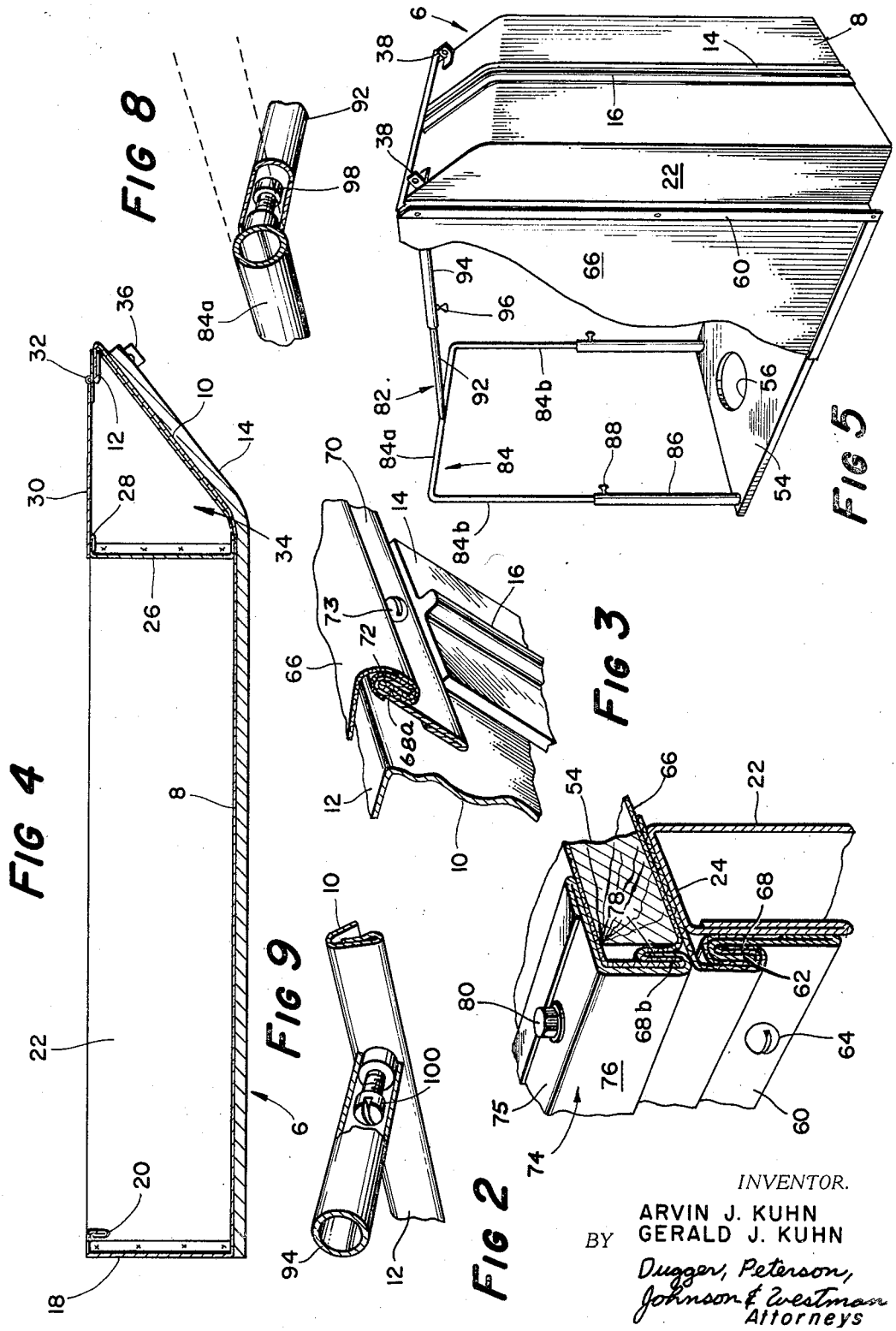
INVENTOR.
ARVIN J. KUHN
BY GERALD J. KUHN
Dugger, Peterson,
Johnson & Westman
Attorneys United States Patent Office 3,492,015
Patented Jan. 27, 1970

3,492,015
COMBINED SLED AND COLLAPSIBLE SHELTER
Gerald J. Kuhn, 459 Maple Ave. NE., Minneapolis, Minn. 55432, and Arvin J. Kuhn, 36 106th Ave. NE., Minneapolis, Minn. 55433
Filed Apr. 29, 1968, Ser. No. 724,775
Int. Cl. B62b 13/00, 17/00
U.S. Cl. 280—12                                                   3 Claims

ABSTRACT OF THE DISCLOSURE

A sled of suitable material has a curved portion at one end and near this end is a transversely extending partition that not only strengthens the sled but forms one side of a compartment. Rearwardly of the relatively small compartment is a relatively large compartment in which game or equipment may be placed, a compartment sizeable enough to hold a large deer. The sled has provision for a hitch and snow guard which allows it to be towed from the woods by a conventional snowmobile. A collapsible shelter is also provided, marginal portions being secured to the sled and to a hinged wooden cover so that the entire structure can be utilized as a small house for ice fishing or hunting purposes. Free of the shelter the sled may be used by children in sliding down hills or by others for doing various chores.

BACKGROUND OF THE INVENTION

Field of the invention

This invention relates generally to a sled suitable for hauling game from a wooded area and pertains more particularly to such a sled that may also be used as a shelter for ice fishing purposes.

Description of the prior art

Sleds and toboggans, of course, are well known. However, prior art constructions have not been suitable for hauling game from the woods because they are either too heavy, too costly or do not provide adequate space. Still further, prior art devices do not have smaller compartments that can be utilized for stowing ammunition, vacuum bottles, small arms and fishing tackle. Also, the prior art arrangements do not allow the attachment of a collapsible shelter so that the sled can be satisfactorily used by ice fishermen. Yet another shortcoming of prior art sleds is that they are not sufficiently rigid so that they can be pulled over a rough terrain by hand or snowmobile.

SUMMARY OF THE INVENTION

Accordingly, one object of the present invention is to provide a multi-purpose sled that will overcome the disadvantages of prior art constructions. More specifically, it is an aim of the present invention to impart sufficient rigidity to the shell constituting the sled. Also, it is an object of the invention to provide a cover that can be folded down to constitute the floor of a house for fishing and hunting, a collapsible shelter being associated with the sled which can be erected very rapidly. Yet another object of the invention is to provide a sled that can be fabricated at low cost.

Thus, the instant invention involves the utilization of a sled having a transverse partition that forms a compartment at one end. Easy means are provided for attaching and detaching a collapsible shelter.

BRIEF DESCRIPTION OF THE DRAWINGS

FIGURE 1 is a perspective view of the sled being towed with its wooden cover installed and illustrating a snow guard attached to its hitch;

FIGURE 2 is a fragmentary view in section illustrating the molding for anchoring the marginal edges of the canvas along the sides of the sled;

FIGURE 3 is a fragmentary sectional view illustrating the means for anchoring the canvas at the forward end of the sled depicted in FIGURE 1;

FIGURE 4 is a longitudinal sectional view taken in the direction of line 4—4 of FIGURE 1 but with the shelter structure removed;

FIGURE 5 is a perspective view of the sled and shelter when used for ice fishing purposes, a portion of the canvas being removed so as to expose the framework which supports and spreads the canvas;

FIGURE 6 is another perspective view, this view being taken at a different angle from that in which FIGURE 5 is taken and portions of the canvas also being removed so as to show a feature that would otherwise be concealed;

FIGURES 7–10 illustrate fragmentary details that are embodied in the combined sled and shelter.

DESCRIPTION OF THE PREFERRED EMBODIMENT

Referring now in detail to the drawings, the sled has been designated by the reference numeral 6. Accordingly, there is a bottom panel 8 having a curved shovel portion 10 which allows the sled to move over rough terrain. At the upper edge of the shovel portion 10 is an integral flange 12 that serves a dual purpose as later will become manifest. At this time, though, attention is directed to FIGURES 1, 3, and 5 in which a keel strip 14 having a rib 16 thereon functions as a guide means when the sled is being pulled, the strip 14 being attached to the lower surface of the bottom panel 8 and extending to a location near the upper edge of said curved portion.

Continuing with the description of the sled 6, it will be noted that there is a rear panel 18 formed with a forwardly directed channel portion 20 as can be discerned from FIGURE 4. Still further, the sled 6 is comprised of parallel side panels 22 each having an outwardly directed channel portion 24. The rear panel 18 and the side panels 22 are perpendicular with respect to the bottom panel 8. The side panels 22 are contoured so as to conform to the curvature of said curved portion. The edges of the various panels 18, 8 and 22, as well as the curved or shovel portion 10, are attached.

A partition 26 is welded between the side panels 22 and has a forwardly directed flange 28 at its upper edge. A lid 30 is appropriately secured to one leaf of a hinge 32, the other leaf of said hinge being attached to the flange 12 of the shovel portion 10. In this way, a compartment 34 is provided of a size capable of containing various accessories that may be used by either the sportsmen or others. A larger compartment 35 is rearwardly of the partition 26, being formed by the partition, the rear panel 18 and the side panels.

In order to permit the sled 6 to be pulled, such as by a snowmobile, a pair of angles or ears 36 are attached to the shovel portion 10. Through the agency of a pair of bolts or pins 38, an A frame 40 composed of converging elongated members can be attached to the sled. The A frame 40 extends forwardly, as can be seen in FIGURE 1, and connects with a forwardly directed tongue 42, a bolt 44 serving as the connecting means and a nut 46 keeping the bolt in position.

Since it is contemplated that the sled 6 will be towed by a snowmobile, provision is made for preventing the rearward throw of snow as the snowmobile tows the sled. Accordingly, a pair of bracket strips 48 are formed so that they have upwardly turned sections that are secured by the previously mentioned bolt 44. A series of screws 50 in each of the brackets 48 function to attach a snow guard 52. Hence, the snow guard 52 is suspended forwardly of the sled 6 and effectively prevents snow from being thrown rearwardly onto the sled.

A wooden cover panel 54 has an ice fishing hole 56 formed therein. A pair of hinges 58 are secured to the wooden cover in one instance and to the earlier-mentioned channel 20 in the other instance. Suitable screws or bolts allow the cover 54 to be removed if circumstances so dictate.

As best seen from FIGURE 2, side molding strips 60 are utilized, each of these strips 60 having a reversely bent portion 62. By virtue of any preferred number of screws 64, the molding strips 60 can be attached to the outwardly directed channel portions 24 of the side panels 22. The molding strips function to secure the marginal portions of a canvas 66, the canvas 66 having a fold at 68 which assists in the firm anchoring or retention of the canvas to the strips 60. At the front or shovel portion 10 of the sled 6 is a front molding strip 70 which is reversely bent at 72, this being readily discernible from FIGURE 3. Here again, the reversely bent section 72 allows the canvas to be held by means of a fold 68a. Corresponding to the screws 64 are screws 73 which detachably mount the front molding strip 70 to the sled 6.

The molding for retaining the marginal portions of the canvas 66 to the wooden cover 54 can perhaps be best seen from an inspection of FIGURE 2. These angle molding strips are labeled 74 and have a horizontal flange 75 and a vertical flange 76 which is reversely bent at 78. Here again, suitable screws 80 can be utilized for attaching the molding strips 74 to the sides of the wooden cover 54. It will be perceived from FIGURE 2 that a fold 68b is used for anchoring the canvas 66 to the sides of the cover 54.

When the sled is used as a shelter, a frame structure generally denoted by the reference numeral 82 is employed. From FIGURE 5 it will be observed that a U-shaped section 84 composed of a bight 84a and parallel legs 84b is inverted and the lower ends of the legs are telescopically received in tubular posts 86 that extend upwardly from the cover 54 which now functions as a floor. Set screws 88 retain the U-shaped section 84 at the appropriate height so as to stretch to some extent and thus spread the overlying canvas 66 that is to provide protection for the sportsmen. Although not visible in FIGURE 5, FIGURE 7 clearly shows one of the two locating screws 90 that project upwardly from the free corners of the panel 54 that is now functioning as a floor into the lower ends of the tubular posts 86 so as to keep the posts 86 from inadvertently shifting.

The frame structure 82 further includes a longitudinal brace section 92 that is telescopically received in a tubular section 94. By means of a set screw 96, these sections 92 and 94 can be retained in the proper telescopic relation so as to maintain the U-shaped section 84 and the posts 86 thereunder in a substantially vertical position and thus maintain the canvas 66 in its spread condition. FIGURE 8 illustrates a screw 98 which projects into one one end of the section 92, the screw being carried by the bight 84a of the U-shaped section 84. A similar screw 100 is carried on the flange 12 of the shovel portion 10 and projects into the section 94.

It will be appreciated that the various screws 90, 98 and 100 allow the frame structure 82 to be readily erected and subsequently knocked down without difficulty. A zipper 102 in the canvas 66 provides an entrance way into the interior of the shelter, the zipper 102 being visible in FIGURE 6.

Having presented the foregoing information, the benefits to be derived from the invention should be manifest. The sled 6 can be used for a variety of purposes, being especially suited for use by hunters in removing deer from locations in wooded areas after the deer has been shot. Yet, when the user desires to go icefishing, he is provided with a ready shelter that can be unfurled and erected by reason of the various members 84, 86, 92 and 94. The compartment 34 formed by the partition 26 is functional irrespective of whether the sled 6 is horizontal or vertical. Furthermore, the partition which is attached in place serves as a reinforcing means of the sled.

We claim:

1. A sled comprising a generally flat bottom of sheet material having a curved end portion, a pair of parallel side panels of sheet material integral with the side edges of said bottom and extending perpendicularly therefrom, said side panels conforming to the curvature of said end portion, a rear panel integral with said bottom and extending between said side panels, a partition panel secured to said bottom adjacent said curved end portion and extending between said side panels to divide the interior of said sled into a first relatively small compartment and second relatively large compartment, said curved end portion having an integral flange extending between said side panels and directed toward said partition panel, and a lid hingedly connected at one edge to the flange on said curved end portion and of a size so that its opposite edge extends to the edge of said partition panel.

2. The sled of claim 1 in which said partition has an integral flange extending between said side panels and directed toward said first-mentioned flange, the free edge of said lid overlying said last-mentioned flange when closing said relatively small compartment.

3. The sled of claim 2 including a cover panel hingedly connected to the rear panel and of sufficient size to overlie said side panels and said first-mentioned flange, said cover panel serving as a floor when said sled is placed in an upright position.

References Cited

UNITED STATES PATENTS

| 345,829 | 7/1886 | Cary | 280—24 |
| 2,473,076 | 6/1949 | Scheibner | 280—12 |
| 2,865,655 | 12/1958 | Boyser | 280—154.5 |
| 3,017,194 | 1/1962 | Anderson | 280—8 |

LEO FRIAGLIA, Primary Examiner

ROBERT R. SONG, Assistant Examiner